US010359904B2

(12) United States Patent
Ishimoto et al.

(10) Patent No.: US 10,359,904 B2
(45) Date of Patent: Jul. 23, 2019

(54) GRAPHIC USER INTERFACE POINTER CONTROL

(75) Inventors: Kenya Ishimoto, Machida (JP); Masao Nishimoto, Machida (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 195 days.

(21) Appl. No.: 13/316,189

(22) Filed: Dec. 9, 2011

(65) Prior Publication Data

US 2012/0146900 A1   Jun. 14, 2012

(30) Foreign Application Priority Data

Dec. 14, 2010   (JP) .................................. 2010-278353

(51) Int. Cl.
*G06F 3/0481* (2013.01)
*G06F 3/033* (2013.01)

(52) U.S. Cl.
CPC .................. *G06F 3/04812* (2013.01)

(58) Field of Classification Search
CPC .... G06F 3/033; G06F 3/04812; G06F 3/0481; G06F 1/1616; G06F 1/1649; G06F 1/1694; G06F 2200/1637; G06F 3/1423; G09G 2380/14
USPC ........................... 715/856, 857; 345/145, 147
See application file for complete search history.

(56) References Cited

U.S. PATENT DOCUMENTS

| | | | |
|---|---|---|---|
| 5,585,821 A * | 12/1996 | Ishikura ................ | G06F 3/0481 345/1.1 |
| 5,596,347 A | 1/1997 | Robertson et al. | |
| 5,598,183 A * | 1/1997 | Robertson ........... | G06F 3/04812 345/157 |
| 5,703,620 A | 12/1997 | Keyson | |
| 5,786,805 A | 7/1998 | Barry | |
| 5,801,699 A | 9/1998 | Hocker | |
| 6,018,340 A * | 1/2000 | Butler ..................... | G06F 3/038 345/156 |
| 6,137,487 A | 10/2000 | Mantha | |
| 6,489,975 B1 | 12/2002 | Patil | |
| 7,109,975 B2 | 9/2006 | Fedorak et al. | |
| 7,557,774 B2 * | 7/2009 | Baudisch ................ | G06F 3/038 345/1.1 |
| 8,482,521 B2 * | 7/2013 | Abe et al. ..................... | 345/156 |
| 2002/0003529 A1 | 1/2002 | Takese et al. | |

(Continued)

FOREIGN PATENT DOCUMENTS

JP        62129886 A     6/1987
JP        06274305 A     9/1994
(Continued)

*Primary Examiner* — Patrick N Edouard
*Assistant Examiner* — Douglas M Wilson
(74) *Attorney, Agent, or Firm* — Grasso PLLC

(57) ABSTRACT

Flexibly controlling the movement, direction or speed of a pointer in a multi-monitor or extended monitor environment is provided. This may include defining a control area in which the pointer is made to operate in a desired manner at a desired position, recording definition data that includes an identification name uniquely identifying the control area, reading the definition data, and controlling the pointer in response to the pointer entering the control area. The pointer controlled in accordance with the control setting corresponding to the control item in the definition data defined for the control area.

19 Claims, 9 Drawing Sheets

(56) References Cited

U.S. PATENT DOCUMENTS

| | | | |
|---|---|---|---|
| 2003/0120697 A1 | 6/2003 | Wyke et al. | |
| 2005/0268250 A1 | 12/2005 | Skistimas | |
| 2006/0033712 A1* | 2/2006 | Baudisch | G06F 3/038 345/157 |
| 2006/0038741 A1 | 2/2006 | Mori et al. | |
| 2006/0143580 A1* | 6/2006 | Gimness | G06F 3/0354 715/856 |
| 2007/0219651 A1* | 9/2007 | Kawakami | G06F 3/038 700/83 |
| 2010/0127972 A1* | 5/2010 | Yadavalli | G06F 3/04812 345/157 |
| 2010/0309122 A1* | 12/2010 | Abe | G06F 3/04812 345/157 |

FOREIGN PATENT DOCUMENTS

| | | | | |
|---|---|---|---|---|
| JP | 07160236 | A | 6/1995 | |
| JP | 10-198520 | A | 7/1998 | |
| JP | H11259205 | A | 9/1999 | |
| JP | 2000-305685 | A | 11/2000 | |
| JP | 2006059251 | A | 3/2006 | |
| JP | 2006-268154 | A | 10/2006 | |
| JP | 2006-330912 | A | 12/2006 | |
| JP | 2009-301082 | A | 12/2009 | |
| JP | 2010-157244 | A | 7/2010 | |
| JP | 2010-157245 | A | 7/2010 | |
| JP | 2010-541026 | A | 12/2010 | |
| WO | WO 2009/044432 | A1 * | 4/2009 | 345/156 |

* cited by examiner

Figure 2

| CONTROL ITEM | | | CONTROL SETTINGS |
|---|---|---|---|
| IDENTIFICATION NAME | | | D1 |
| PROPERTY | | AREA SHAPE | R |
| | | POSITION | (100,100)-(200,200) |
| | | SIZE | |
| | | ATTRIBUTE | 1 |
| MOVEMENT SPEED THRESHOLD | | | 0 |
| PERMITTED MOVEMENT DIRECTION | | RIGHT | ON |
| | | LEFT | OFF |
| AMOUNT OF DEFLECTION | RIGHT | TARGET | - |
| | | PATTERN | - |
| | LEFT | TARGET | - |
| | | PATTERN | - |
| MOVED-TO LOCATION | | | D4 |

GRAPHIC USER INTERFACE POINTER CONTROL

The present invention relates to pointer control, and more particularly to user interface pointer control in a multi-monitor environment or an extended-monitor environment.

BACKGROUND

Known implementations of user interface pointer control in a multi-monitor (or multi-display) system include one that limits pointer movement within a display area on a single monitor and one that allows a pointer to be freely moved between monitors. At present, the latter way of control is generally used in the form of an extended desktop.

A multi-monitor system can be used in various combinations and forms, such as combination of monitors of different display sizes or using a particular monitor as a main work area and others for reference purposes. For example, when monitors that are connected simultaneously are increased in number or when monitors having different screen sizes are combined, a pointer has to cover a longer distance, which in turn increases the time required for pointer movement. The user consequently has to move the pointer quickly and can lose track of the pointer he or she is operating on a screen.

Also, when a pointer (e.g., a cursor) is moved between two monitors, respectively having large and small display areas, horizontal movement from the small to large display is possible without any alteration but horizontal movement from the large to small display may not be possible unless addressed in some way.

When a number of applications are displayed in display areas of multiple monitors, an operation to move a pointer to a particular application displayed on a particular monitor becomes more difficult with an increase in the number of monitors and an expansion of display areas. A conventional technique is described in Japanese Patent Laid-Open No. 2006-059251. This Laid-Open discloses a technique pertaining to a multi-monitor system with improved mouse operability for an extended desktop environment. According to a method provided thereby, a predefined area is displayed at a point where a first screen and a second screen are connected, and when a mouse pointer is moved near the area, the pointer is paused or a monitor number is displayed on a screen toward which the pointer is being moved. This method, however, considers only the area of monitor connection and does not provide pointer control that flexibly adapts to the user's operation environment or pointer behavior.

BRIEF SUMMARY

Embodiments of the present invention may enable pointer control that can flexibly adapt to a user's operation environment and/or pointer behavior. For example, in embodiments, the speed and direction of pointer movement can be flexibly controlled and a pointer can be efficiently moved to and returned from an application positioned at a distance. Thus embodiments may provide better pointer control that is ergonomically exceptional.

Embodiments may, thus, provide an ergonomically advantageous pointer control method and system that flexibly adapts to a user's operation environment in a multi-monitor environment. Embodiments may further provide a method and system for flexibly controlling the direction and speed of pointer movement in a multi-monitor environment as well as a method and system for controlling a pointer in relation to an application being used in a multi-monitor environment. In embodiments, a user may freely define a control area in a display area in which pointer movement is limited or enhanced and embodiments may directly or indirectly control the pointer in accordance with the user's definition in a multi-monitor environment.

Embodiments of the invention can include a system for controlling a pointer on multiple monitors. In embodiments a pointer control system may be provided that comprises a control area defining unit that defines a control area in which the pointer is made to operate in a desired manner, at a desired position in a display area on one or more monitors. In this and other embodiments, the control area defining unit may record definition data that includes an identification name uniquely identifying the control area, and a control item and corresponding control setting for the pointer when in the control area. Still further, this and other embodiments may also comprise a pointer control unit that reads the definition data and controls the pointer, wherein the pointer control unit may control the pointer in response to the pointer entering the control area and in accordance with the control setting corresponding to the control item in the definition data defined for the control area. In these and other embodiments the control item may still further include a movement speed threshold, permitted movement direction, or moved-to location identifier.

Other embodiments may include processes for controlling a pointer on an extended monitor and multiple monitors. In process embodiments, a pointer control method that may be employed may comprise defining a control area in which a pointer is made to operate in a desired manner, at a desired position, and in a desired display area on the monitors, wherein definition data may include an identification name uniquely identifying the control area, and a pair of a control item and a corresponding control setting for the pointer when in the control area is recorded. The process in embodiments may further comprise reading definition data and controlling the pointer, wherein the pointer may be controlled in response to the pointer entering a control area and may be controlled in accordance with control settings corresponding to a control item in the definition data defined for the control area. In embodiments, the control item may also include a movement speed threshold, permitted movement direction, or one or more moved-to location identifiers. Control settings for the moved-to location in these and other embodiments may be coordinates in the display area, an identification name of the control area, or an application identifier.

Thus, various embodiments may be employed. Generally speaking, these may include apparatus, systems, processes, and articles of manufacture. Embodiments may provide for pointer (mouse, cursor, pen etc.) control that can be ergonomically suitable and that flexibly can accommodate complicated factors of use, such as user's environment, pointer movement speed, direction of movement, and applications being used. The control item may further include control area property or an amount of deflection. Embodiments may also comprise control settings for the moved-to location. These settings may be determined using coordinates in the display area, an identification name of the control area, or an application identifier. Still further, in embodiments, the application identifier may be an application name, an application path, or a process ID of an application, and the control item may further include control area property or an amount of deflection and the control area property may include area shape, position, size, and attribute.

BRIEF DESCRIPTION OF THE SEVERAL VIEWS OF THE DRAWINGS

FIG. 2 shows contents of definition data 180 configured on a control panel 140 of embodiments of the invention;

DETAILED DESCRIPTION

Embodiments of the present invention are described herein. These embodiments, should not, however, serve to limit the invention solely to these embodiments. For example, it goes without saying that pointer control according to embodiments can be applicable to any kind of display device that displays a pointer, such as television screens, projectors, presentation equipment, mobile phones, and gaming machines, in addition to computer displays.

Figure 1:
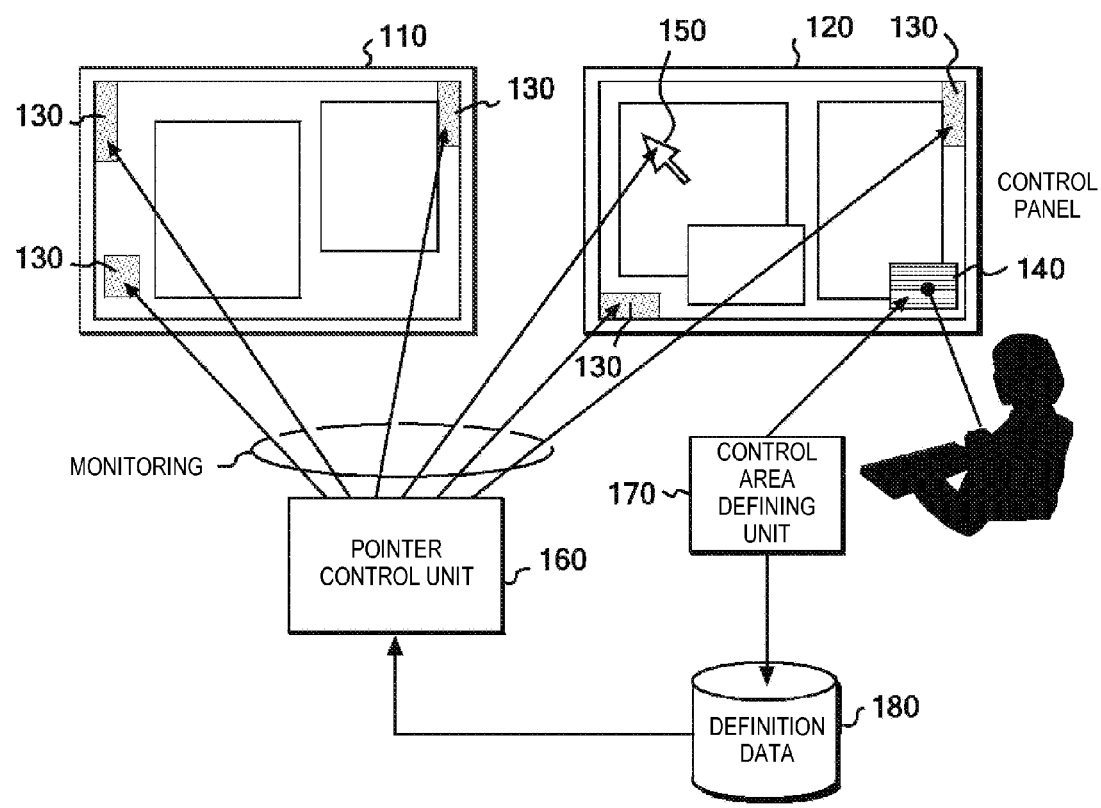
FIG. 1 generally shows a pointer control method according to embodiments of the invention.

FIG. 1 generally shows a pointer control method according to a first embodiment of the invention. Between multiple display monitors 110 and 120, a user moves a pointer 150 using a mouse, cursor key, or others kind of pointing device. Embodiments can provide predefined operation control of the pointer 150 as the pointer enters, moves to, and exits a control area configured in a display area on the monitor. The components and embodiments described herein may also be separately realized in hardware.

FIG. 1 shows a control area defining unit 170 that may be configured to display a control panel 140 on a monitor for defining a control area 130. In embodiments, a user may operate the control panel 140 to make settings beforehand as to where in the display area of the monitors to position a control area 130 for controlling the pointer and how to control the operation of the pointer in the control area. Setting data may be recorded as definition data 180. Also, the control area defining unit 170 may be referenced by a pointer control unit 160 and may monitor the position of the pointer displayed on a monitor. In embodiments, distance of movement per unit time can be determined from monitoring of pointer position, which in turn allows calculation of the movement speed of the pointer.

In embodiments, the pointer control unit 160 may keep track of whether the pointer 150 has entered the control area 130, how fast it is moving, and whether it has exited the control area 130, and may perform predetermined control in accordance with control settings for that control area. Predefined control settings may be recorded in the definition data 180 configured by the user using the control panel. The control area 130 can be made either visible or invisible through the control panel.

FIG. 2 shows contents of definition data 180 configured on the control panel 140 according to embodiments of the invention. The left column represents control items and the right column specifies control settings for the items. At least one pair of a control item and control setting may be established, and values that have been set may be recorded in a storage device as definition data. One set of definition data is defined per control area 130. Control items are described below.

For example, the identification name may be a name to uniquely identify the control area. In FIG. 2, D1 (Domain 1) represents the identification name.

Control area property is an item for defining the shape, position, size, and attribute of the control area. In the example of FIG. 2, the shape is set to rectangle (R) and the position is specified with coordinates, but the position is preferably an absolute position within a virtual screen. In FIG. 2, the position is set to (100,100)-(200,200). When the shape is set to circle (C), central coordinates will be specified as the position and radius as the size. Attribute specifies whether to make the control area invisible (0) or visible (other than 0, a color attribute number).

Movement speed threshold is a control item for specifying a threshold value for the movement speed of the pointer above which its control in the control area is valid. By way of example, if 20 (dot/s) is specified with this item, a pointer moving at a speed above 20 (dot/s) is put under control and a pointer moving at a speed below 20 (dot/s) is not subjected to control. Movement speed is determined by recording coordinates at which the pointer was previously positioned (the last recorded coordinates) and calculating the difference between the last coordinates and current or new coordinates. The default threshold may be preferably 0.

Permitted movement direction is a control item for limiting the direction in which the pointer can move. For example, to limit movement to the right, the corresponding control setting is set to ON. If x-coordinate has increased more than a threshold, x-coordinate may be put back to the last recorded position. Likewise, to limit movement to the left, the corresponding control setting is set to ON. If x-coordinate has decreased more than the threshold, the x-coordinate may be put back to the last recorded position.

This pointer control can prevent the pointer from going off the screen to be lost when the pointer is moving at a high speed in the control area, for example. In contrast, slow movement below the threshold is not controlled. In the example of FIG. 2, the pointer cannot be moved to the right because right movement is ON and left movement is OFF. When the threshold is set to 10, for example, fast movement to the right at a speed above 10 can be inhibited, while the pointer is allowed to pass through the control area when moving slowly below the speed of 10. Although the embodiment described implements limitation on horizontal direction in the example of FIG. 2, limitation on vertical or y-coordinate direction is also possible by a similar mechanism in embodiments.

Figure 3:
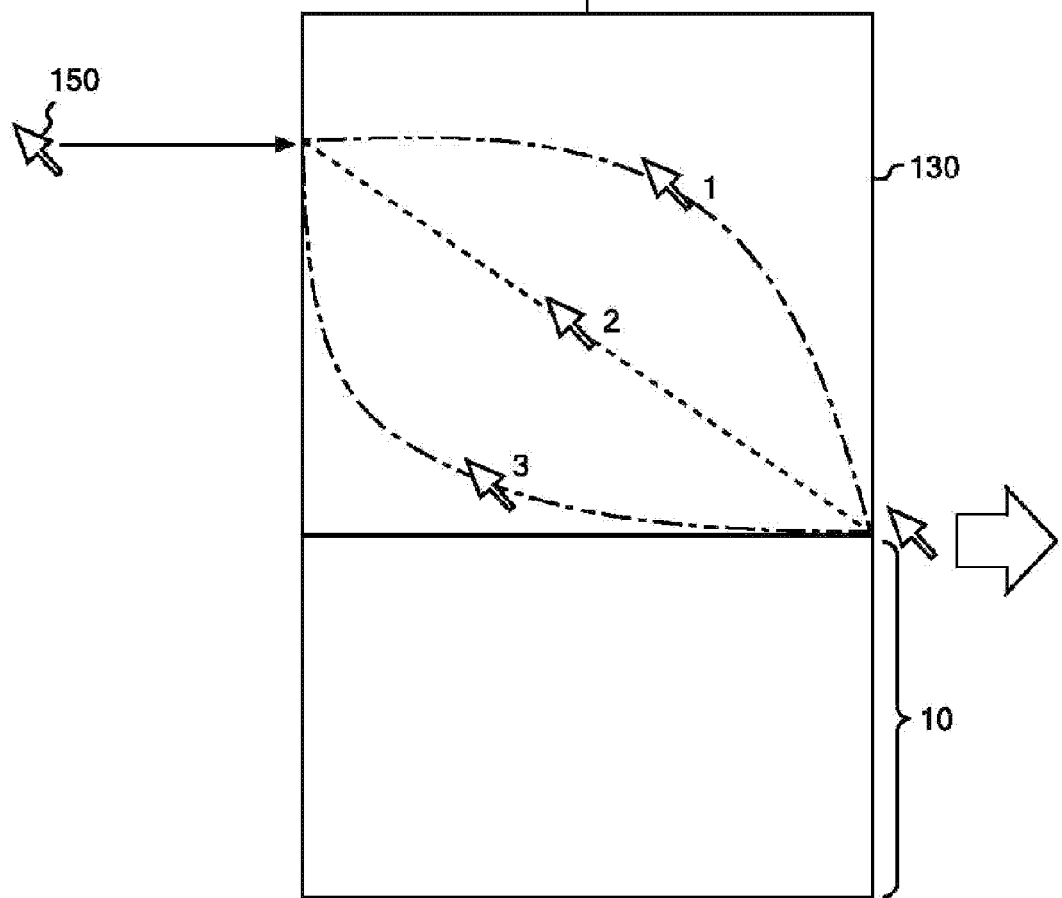
FIG. 3 is an illustration of deflection of movement direction.

The amount of deflection may be a control item for guiding the pointer to move in a desired direction. FIG. 3 is an illustration describing deflection of movement direction. When the user wants to guide the pointer downward in y-axis direction when the pointer 150 has entered the control area 130 from left to right, the user designates "target value (y-axis):10", and "pattern: 1" for "right" in the control item of amount of deflection, as illustrated in FIG. 3. Pattern represents the type of movement curve used for guiding, for which three options are available in this embodiment. In the example setting of FIG. 3, when a monitor of a large display area is installed on the left and a monitor with a small display area is on the right, pointer movement can be smoothly controlled as the pointer moves from left to right.

Moved-to location is a control item for specifying where to move the pointer when the pointer has exited the control area. For example, if coordinates are specified with this item, the pointer jumps to the position of the coordinates. The coordinates are preferably an absolute position within a virtual screen including multiple monitors. Alternatively, a monitor number and the coordinates of the display area of that monitor may be specified instead.

Preferably, jump to the moved-to location specified by coordinates functions only when the pointer exits the control area in the same direction as it entered the control area and does not function when the pointer moves in a direction opposite to the direction in which the pointer entered the control area (i.e., when the pointer moves backward). When the identification name of the control area is specified as the moved-to location, the pointer jumps to the specified control area. An application identifier may also be specified as the moved-to location.

Figure 4:
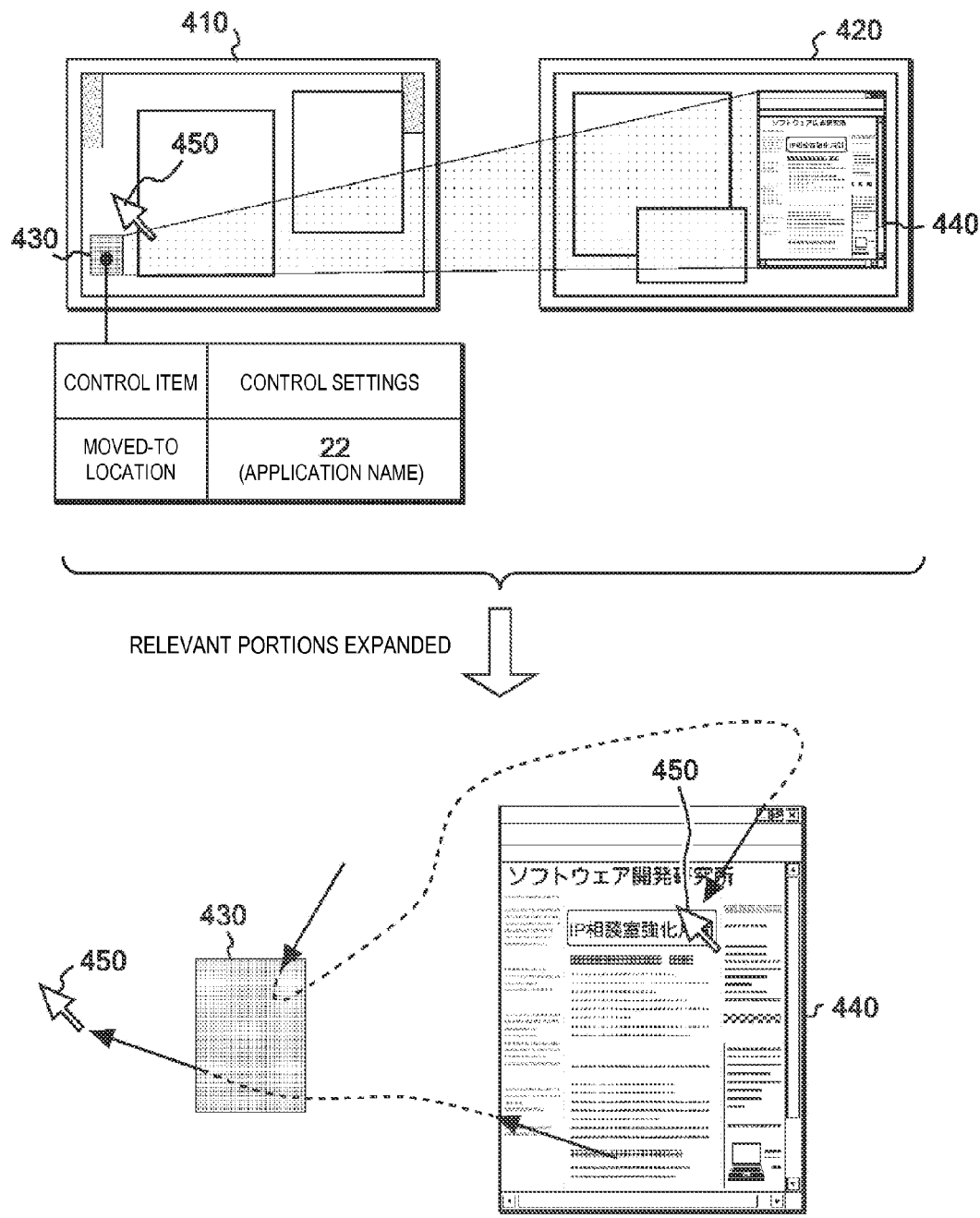
FIG. 4 is an illustration of control operations for when an application identifier is specified as moved-to location.

FIG. 4 illustrates control operations performed when an application identifier is specified as the moved-to location. An application identifier is one of the name, process ID, and path name of an application, although any other information that can uniquely identify an application may be used.

The present invention uses the process ID of an application as an application identifier. A process ID is assigned as a unique number to an application running on an OS. The process ID can be easily acquired by making an inquiry to the OS. Preferably, application name is also displayed with the process ID.

In FIG. 4, a display monitor 410 and a display monitor 420 are set up as an extended desktop. The pointer can freely move between the monitors and a control area 430 may be positioned on the monitor 410 and an application 440 may be displayed on the monitor 420. The process ID of the application 440 is 22.

By way of example, assume that process ID 22 is designated as the moved-to location in definition data for the control area 430. In this case, when the pointer 450 enters the control area 430, the pointer 450 jumps to the display area of the application 440 on the monitor 420. While the pointer 450 can freely move within the application 440, but once it has gone outside (e.g., above) the display area of the application 440 even by a small amount, it jumps to above the control area 430 on the monitor 410.

The lower portion of FIG. 4 shows an expanded view of relevant portions including the application 440 and the corresponding control area 430. When the pointer 450 has entered the control area 430, it enters the display area of the application 440 at a position in the application 440 corresponding to the position of entry into the control area and at an angle equivalent to the angle of entry into the control area. Likewise, the pointer 450 exits the control area 430 at the same angle and position in the control area 430 as it exits the application 440. The control area 430 is preferably of a size that is a reduction of the display area of the application 440.

When the application identifier is specified as the moved-to location, the shape and size of the control area may be automatically configured. This automatic configuration may eliminate the necessity to input shape and size and may also allow the user to perceive the shape of the control area as a reduced copy of the display area of the application.

Thus, the control area 430 of FIG. 4 can be used as if it is a reduced-size area of the application 440 displayed on the monitor 420. In other words, specifying the process ID of an application as the moved-to location enables a control area to be associated with the application.

Figure 5:
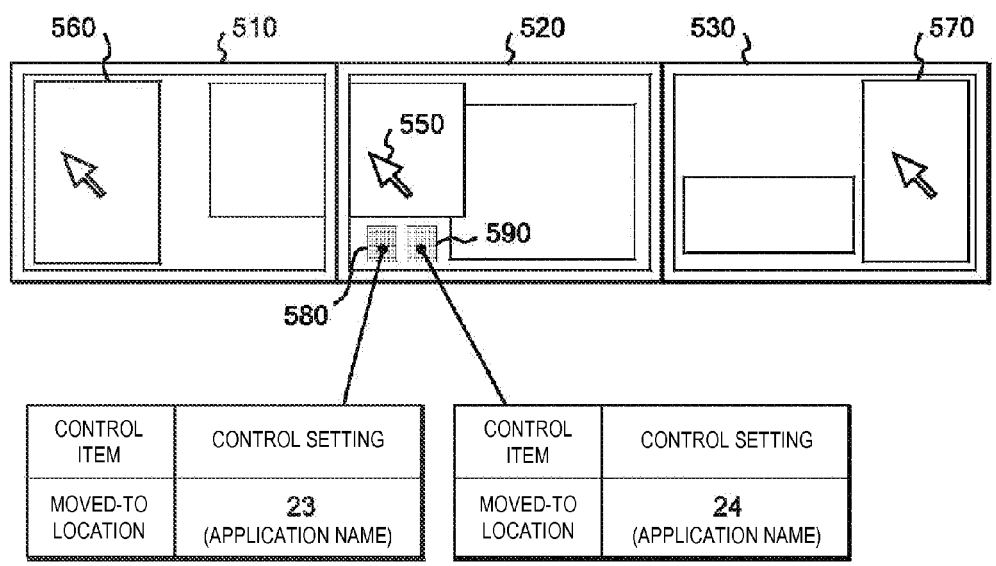
FIG. 5 shows an example where three monitors are set up and a central monitor 520 is used as a work screen.

FIG. 5 illustrates an example where a user sets up three monitors and uses a center monitor 520 as the working screen. In FIG. 5, an application 560 having a process ID of 23 is displayed on the monitor 510, and the main working screen is displayed on the monitor 520, on which control areas 580 and 590 are positioned in a lower left portion. Process ID 23 is specified as the moved-to location which is a control item for the control area 580, and process ID 24 is for the moved-to location which is a control item for the control area 590. On the monitor 530, assume that an application 570 having the process ID of 24 is displayed.

While the user does his work on the main working screen, he moves the pointer 550 into the control area 580 in order to get information that cannot be sufficiently acquired with the application being used on the monitor 520. The pointer 550 then moves into the display area of the application 560. After doing some work and getting information there, the user moves the pointer 550 from the display area of the application 560 and the pointer 550 moves near the control area 580 on the monitor 520. The user further works using the monitor 520 as the main working screen, and moves the pointer 550 to the control area 590 again in order to get other information. The pointer 550 then moves into the display area of the application 570. After doing some work and getting information there, the user moves the pointer 550 from the display area of the application 570. The pointer 550 moves near the control area 590 on the monitor 520. Associating applications with control areas in this manner enables pointer control tailored to the user's work environment.

If it were not for the control area of the invention, the user is required to move the pointer 550 from the monitor 520 into application 560 on the monitor 510, back to the monitor 520, then to the application 570 on the monitor 530, and finally to the monitor 520. In contrast, according to embodiments only movement to and from the control areas 580 and 590 on the same monitor as the pointer 550 is positioned may be required.

Figure 6:
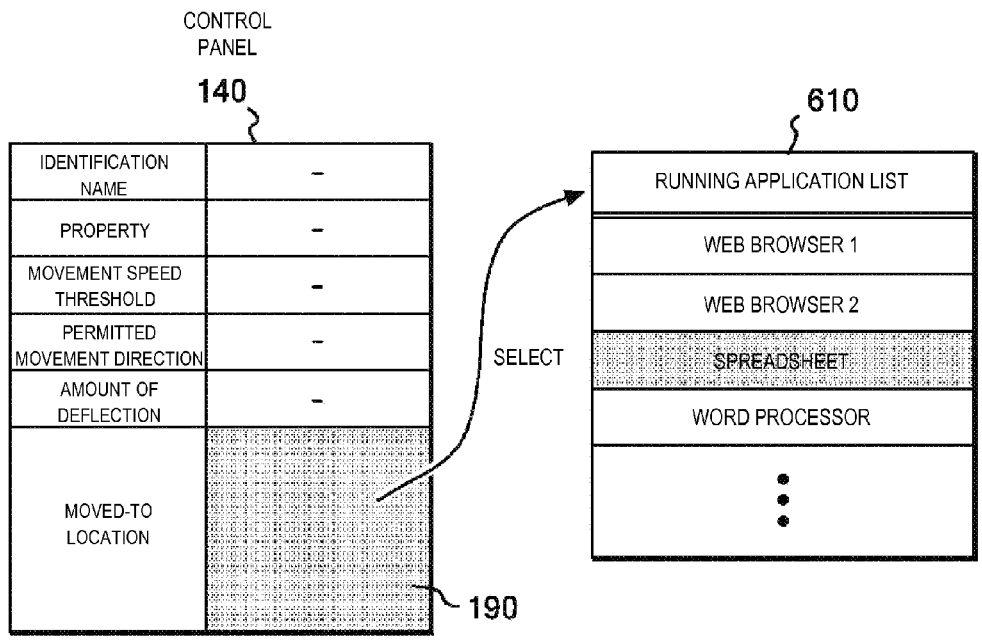
FIG. 6 shows a GUI for specifying an application identifier as moved-to location on the control panel.

FIG. 6 shows a GUI for specifying an application identifier as moved-to location on the control panel. The control panel 140 is displayed and managed by the control area defining unit 170. The user performs a predetermined operation (e.g., a mouse click) on the control setting 190 for moved-to location in the control panel 140 on the monitor 120. In response, a list of currently running applications 610 appears.

As information on the name and process ID of running applications can be acquired by making an inquiry to the OS, the control area defining unit 170 displays the running applications in the list 610. When the user selects a desired application, the process ID of that application is specified as control setting for the moved-to location.

In the example of FIG. 6, a spreadsheet application is selected as the application and the process ID of that application is specified as the control setting for the moved-to location. The control area defining unit 170 records values specified on the control panel in the definition data 180.

In FIG. 6, a moved-to location can be entered directly from a keyboard by performing a certain different operation (e.g., pressing a return key on the keyboard) on the control setting 190 for the moved-to location. For example, the process ID of an application can be directly entered and also an identification number of another control area (e.g., D4) can be entered. Preferably, when a process ID is displayed as the moved-to location, the application name is displayed together. In addition, various forms for displaying an application identifier are possible.

Figure 7:
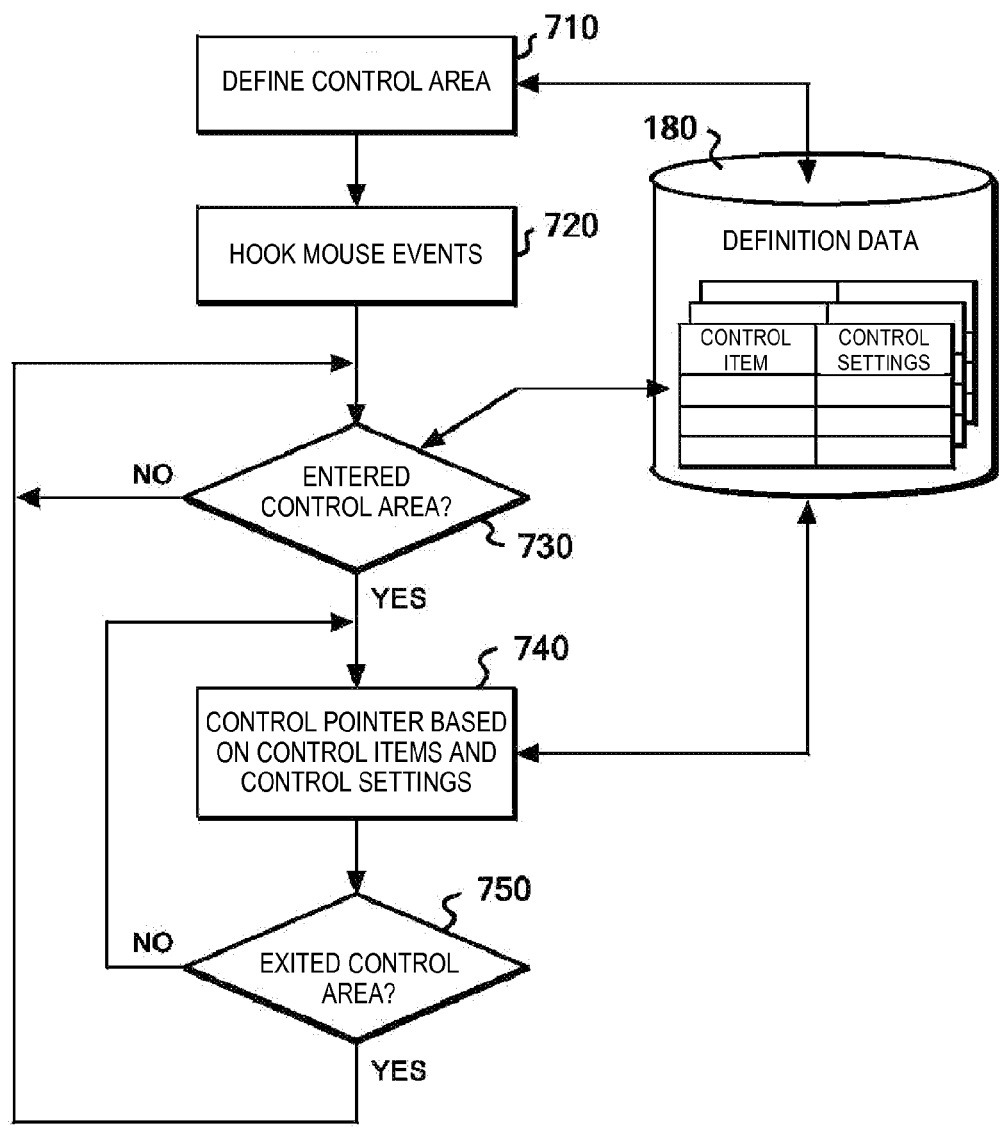
FIG. 7 shows an overall process flow of embodiments of the invention.

FIG. 7 shows an overall process flow of embodiments. Although the following description assumes that the pointer is operated with a mouse, this is not limitation and a track point, a cursor key or the like may be used. First at step 710, the control area defining unit 170 may generate definition data 180 in accordance with control setting specified by the user on the control panel 140. This is equivalent to setting a control area in a virtual screen. At step 720, mouse events for the OS are hooked. This can acquire all mouse coordinates and clicks. As hooking of mouse events is well known, detailed description thereof is omitted. To briefly describe hooking, a message event for a mouse is intercepted and data is modified as necessary (i.e., mouse position, shape, action and the like are rewritten) according to control settings for the control area and passed to the OS. Preferably, it functions as a DLL using a global hook (or system hook).

At step 730, determination is made as to whether the pointer has entered the control area defined by the definition data 180. If the determination results in YES, the pointer may be controlled at step 740 in accordance with control items and their control settings in the definition data 180. More specifically, new coordinates and the like for the mouse may be passed to the OS. At step 750, determination is made as to whether the pointer has exited the control area. If the determination results in NO, the flow returns to step 740. If YES, the flow proceeds to step 730.

Figure 8:
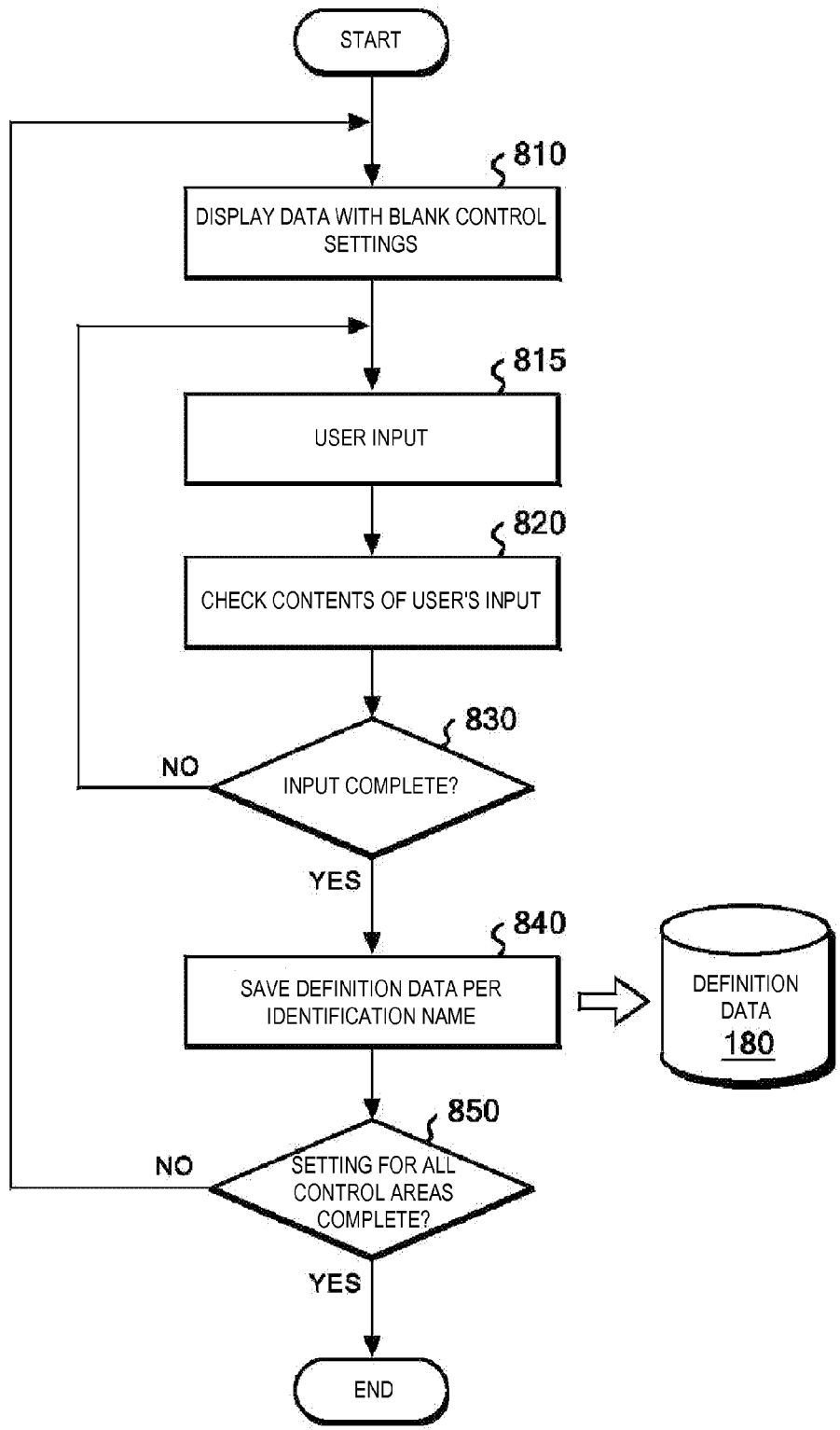
FIG. 8 shows operations of a control area defining unit 170.

FIG. 8 shows operations of the control area defining unit 170. The control area defining unit 170 displays the control panel 140. At step 810, definition data with blank control settings is displayed, and input from the user is waited for at step 815. At step 820, contents of the user's input are checked, e.g., whether each control setting is within an acceptable range. At step 830, determination is made as to whether input for one control area is complete. If the result is NO, the flow returns to step 815. If input is complete at step 830, the flow proceeds to step 840. At step 840, definition data 180 is saved for each identification name of a control area. At step 850, it is determined whether setting for all control areas or all targeted control areas is complete, and if not, the flow returns to step 810. If setting is complete, the process ends.

Figure 9:
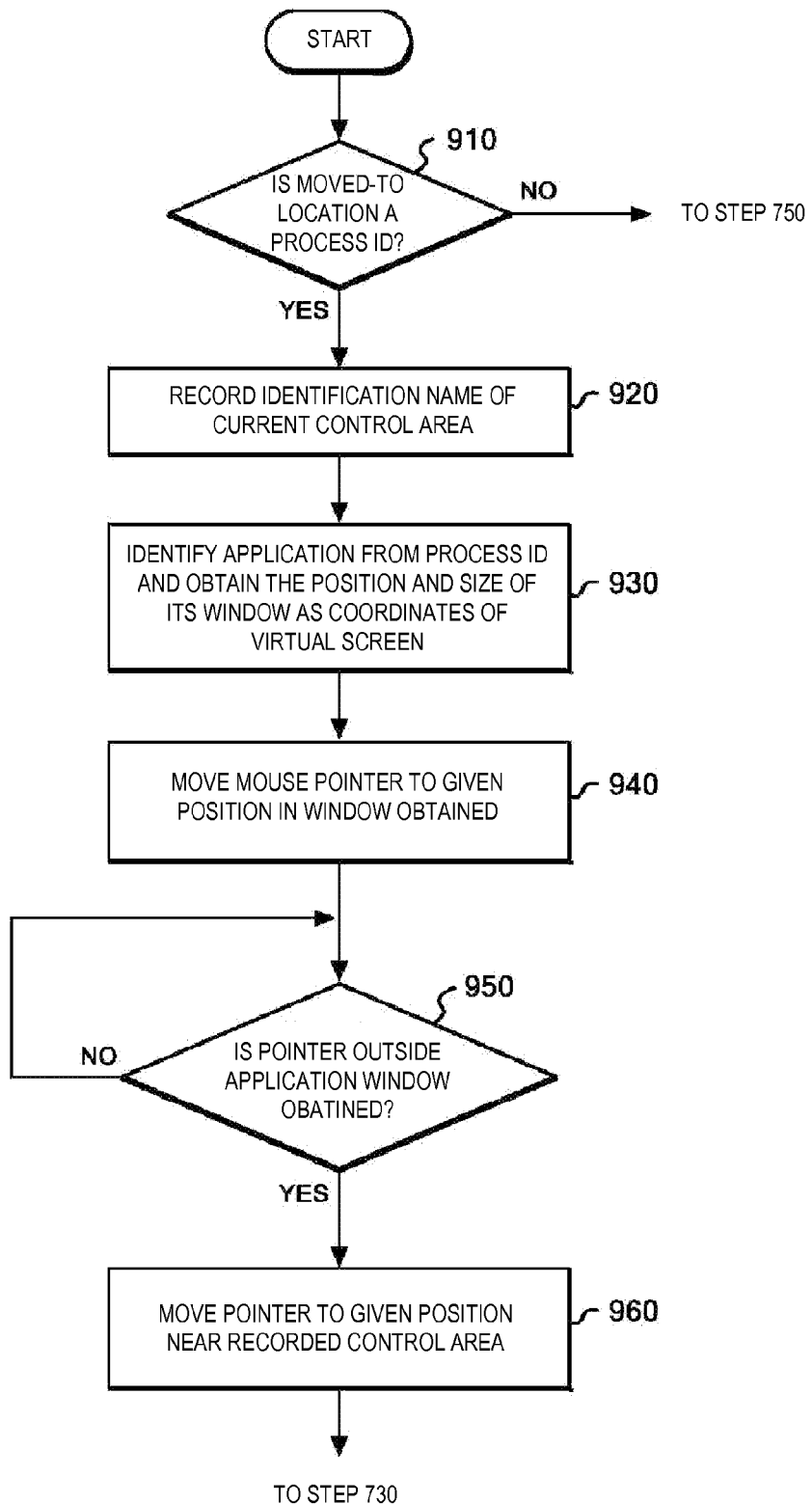
FIG. 9 is a flowchart for when an application identifier is specified as moved-to location.

As an exception to the process at step 740, operations performed when an application is the moved-to location will be described. FIG. 9 shows a flowchart for a case where an application identifier is specified as the moved-to location. First, at step 910, determination is made as to whether the moved-to location is a process ID. If the result is NO, the flow proceeds to step 750. If YES, the identification name of the current control area is recorded at step 920. This information will be necessary later when the pointer returns from the application to which the pointer jumps.

As is shown at step 930, the application may be identified from the process ID, and the coordinates and size of the virtual screen on the application's window may be obtained. At step 940, the mouse pointer is moved to a given position in the window. The position may be the sum of the application window's coordinates (x,y) and half of the size, for example.

At step 950, it is determined whether the coordinates of the pointer are outside the application window. If the result is YES, the pointer is moved at step 960 to a predetermined position near the control area that has the identification name recorded previously. The predetermined position to which the pointer is moved may be above the control area if the pointer has gone outside the application window from its upper side, for example. In other words, the pointer may be moved to the vicinity of the control area in the same direction as it exits the application window. The flow then proceeds to step 730.

Figure 10:
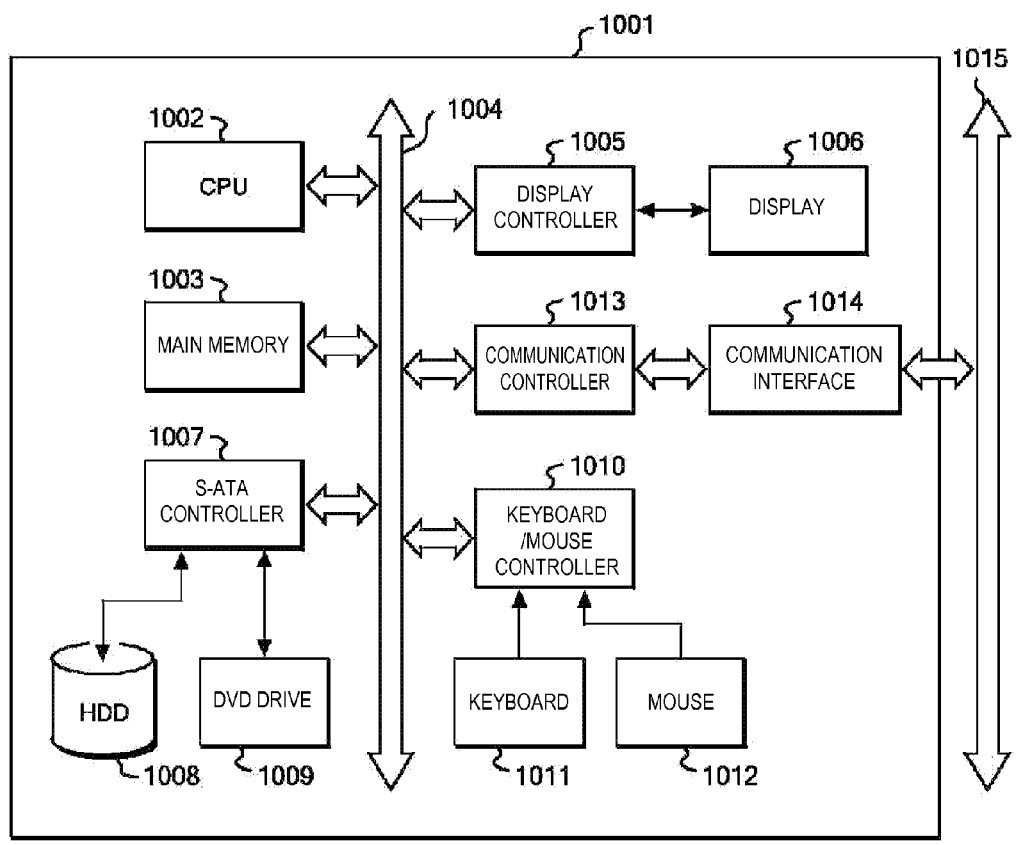
FIG. 10 is a block diagram of an example of computer hardware used with embodiments of the invention.

FIG. 10 shows a block diagram of exemplary computer hardware as may be used for pointer control according to embodiments. A computer system 1001 according to embodiments of the invention may include a CPU 1002 and main memory 1003, which may be connected with a bus 1004. The CPU 1002 may preferably be based on a 32- or 64-bit architecture, and may be Xeon™ series, Core™ series, Atom™ series, Pentium™ series, Celeron™ series from Intel, Phenom™ series, Athlon™ series, Turion™ series, and Sempron™ from AMD, for example.

To the bus 1004, a display 1006, such as an LCD monitor, may be connected via a display controller 1005. The display 1006 may be used for displaying applications and a pointer. To the bus 1004, a hard disk or a silicon disk 1008 and a CD-ROM, DVD or Blu-ray drive 1009 may also be connected via an IDE or SATA controller 1007. A program and definition data according to the invention may be stored in these storage devices. The program and definition data of the invention may be preferably stored in the hard disk 1008 or the main memory 1003 and executed by the CPU 1002 to implement pointer control.

The CD-ROM, DVD or Blu-ray drive 1009 may be used for installing the program of the invention into the hard disk from a CD-ROM, DVD-ROM, or Blu-ray disk, which is a computer-readable medium, or for reading data as necessary. A keyboard 1011 and a mouse 1012, which are subjects of pointer control by the invention, may also be connected to the bus 1004 via a keyboard/mouse controller (1010) or other suitable interaction mechanism or system.

A communication interface 1014 may conform to Ethernet™ protocol, for example. The communication interface 1014 may be connected to the bus 1004 via a communication controller 1013, serving to physically connect the computer system and a communication line 1015 and providing the network interface layer to TCP/IP communication protocol used with communication functions of the operating system in the computer system. External document data or directed graph may be read via the communication line and processed by the CPU 1002.

The pointer control program of the invention can be realized with a machine-executable program written in an object-oriented programming language, such as C++, Java®, Java® Beans, Java® Applet, Java® Script, Perl, and Ruby, as well as in other programming languages. The program can be distributed on a computer-readable recording storage medium and by transmission.

While the invention has been described with respect to its particular embodiments, the invention is not limited to the embodiments and it may be changed within a scope conceivable by those skilled in the art, such as other embodiments, addition, modification, or deletion. In any aspect, such modification is contemplated and should preferably provide the operation and effect of the invention.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

Still further, the corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

What is claimed is:

1. A system for controlling movement of a pointer across and between multiple discrete monitors, the system comprising:
    a control area defining unit configured to define a first pointer movement control area on a first of the multiple discrete monitors, the first pointer movement control area located outside of a display area on the first discrete monitor and a display area on one or more other of the discrete monitors,
        wherein while the pointer is in the first pointer movement control area operation of the pointer changes to follow a first user previously designated pointer movement control setting, the setting automatically triggered when the pointer is in the first pointer movement control area, wherein the pointer is configured to jump, following the first user designated pointer movement control setting, to a display area outside of the first pointer movement control area and outside of any other pointer movement control areas,
        and
    a pointer movement control unit configured to read the first user designated pointer movement control setting and control the pointer for movement across and between the discrete multiple monitors, the pointer movement control unit controlling the pointer in response to the pointer entering the first pointer movement control area and in accordance with the first user designated pointer movement control setting corresponding to the first pointer movement control area.

2. The system according to claim 1, wherein the first user designated pointer movement control setting comprises a moved-to location, the moved-to location comprising:
    coordinates in the display area,
    an identification name of the control area, or
    an application identifier.

3. The system according to claim 2, wherein the application identifier comprises:
    an application name,
    an application path, or
    a process ID of an application.

4. The system according to claim 1, wherein the first user designated pointer movement control setting further comprises an amount of non-linear movement deflection introduced from pointer input to pointer display when operating the pointer in the first pointer movement control area or when pointer input includes non-permitted pointer movement direction or both.

5. The system according to claim 4, wherein the first pointer movement control area has adjustable properties comprising area, shape, position, and size.

6. A method for controlling movement of a pointer on multiple discrete monitors through processing by a computer, the method comprising:
    defining a first movement control area in which the pointer is made to move in a user customizable manner at a user selectable position in a display area which is outside of the first and any other movement control areas,
        wherein definition data that includes an identification name uniquely identifying the first movement control area and a pair of a control item and corresponding user selectable control setting for the pointer when in the first movement control area is determined;
    reading the definition data and controlling the pointer for movement across and between multiple discrete monitors,
        wherein pointer movement is controlled between the multiple discrete monitors automatically in response to the pointer entering the first movement control area and in accordance with the user selectable control setting corresponding to the control item in the definition data defined for the first movement control area,
        wherein the control setting comprises:
            a movement speed threshold, the movement speed threshold specifying at least one of a threshold value for the movement speed of the pointer above or below which pointer control in the first movement control area is invalid but is valid outside the first movement control area, or
            a non-permitted pointer movement direction, or
            an amount of pointer deflection.

7. The method according to claim 6, wherein the user selectable control setting further includes a moved-to location, the moved-to location comprising
    coordinates in the display area, or
    an identification name of the first movement control area, or
    an application identifier.

8. The method according to claim 7, wherein the application identifier comprises:
    an application name, or
    an application path, or
    a process ID of an application.

9. The method according to claim 6, wherein the control item further comprises an amount of non-linear deflection introduced from pointer input to pointer display when operating the pointer in the first movement control area or consistent with permitted movement direction or both.

10. The method according to claim 9, wherein the first movement control area has adjustable properties comprising one or more of area, shape, position, and size.

11. A non-transitory article of manufacture storing instructions for loading and execution by a processor, the instructions, which when loaded and executed by the processor, cause the processor to carry out a process for controlling movement of a pointer comprising:

defining a first movement control area in a first discrete monitor in which a pointer is made to move in a user selectable manner, the user selectable manner being triggered by the processor when entering the first movement control area, to a desired position in a display area, the display area outside of the first movement control area and outside of any other movement control areas, the display area located apart from the first movement control area, the display area in a second discrete monitor; and applying definition data that includes a corresponding user selected control setting for the pointer triggered when in the first movement control area and for controlling the pointer during movement across and between the first and second discrete monitors, wherein the control setting includes one or more user selectable settings for how to control the movement of the pointer, by the user, to or from portions of the display area outside of the first control area.

12. The article of manufacture of claim 11 wherein the instructions, which when executed by the processor, provide that the user selected control setting is a moved-to location that comprises:

coordinates in the display area, or an identification name of the first movement control area, or an application identifier.

13. The article of manufacture of claim 12 wherein the application identifier comprises:

an application name, or an application path, or a process ID of an application.

14. The article of manufacture of claim 11 wherein the user selectable manner comprises an amount of non-linear movement deflection introduced from pointer input to pointer display when operating the pointer in the first movement control area or permitted movement direction or both.

15. The article of manufacture of claim 11 wherein the pointer is further controlled such that when the pointer has entered the first movement control area it automatically jumps to the display area on the second discrete display.

16. The system of claim 1 wherein a user is able to adjust properties of the first movement control area including one or more of the following:

the position of the first movement control area, the shape of the first movement control area, the size of the first movement control area, permitted movement direction of the pointer, an amount of deflection of the pointer, or a moved-to location of the pointer.

17. The method according to claim 6 wherein the definition data is changeable by a user of the computer, the user being able to adjust definition data of the first movement control area including one or more of the following:

the position of the first movement control area, the shape of the first movement control area, the size of the first movement control area, permitted movement direction of the pointer, an amount of deflection of the pointer, or a moved-to location of the pointer.

18. The article of manufacture of claim 11 wherein the definition data is changeable by the user, the user being able to adjust definition data of the first movement control area including one or more of the following:

the position of the first movement control area, the shape of the first movement control area, the size of the first movement control area, permitted movement direction of the pointer, an amount of deflection of the pointer, or a moved-to location of the pointer.

19. The system according to claim 1 wherein the first user designated pointer movement control setting is customizable by the user.

* * * * *